(12) United States Patent
Rinne

(10) Patent No.: US 7,788,348 B2
(45) Date of Patent: Aug. 31, 2010

(54) CONTEXT PROFILE FOR DATA COMMUNICATIONS

(75) Inventor: Mika P. Rinne, Espoo (FI)

(73) Assignee: Nokia Corporation, Espoo (FI)

( * ) Notice: Subject to any disclaimer, the term of this patent is extended or adjusted under 35 U.S.C. 154(b) by 1415 days.

(21) Appl. No.: 11/028,825

(22) Filed: Jan. 5, 2005

(65) Prior Publication Data

US 2006/0164986 A1 Jul. 27, 2006

(30) Foreign Application Priority Data

Nov. 26, 2004 (FI) .................................. 20041528

(51) Int. Cl.
*G06F 15/177* (2006.01)
(52) U.S. Cl. .................... 709/220; 709/202; 709/203
(58) Field of Classification Search .................. 709/220
See application file for complete search history.

(56) References Cited

U.S. PATENT DOCUMENTS

| | | | |
|---|---|---|---|
| 6,185,214 B1 * | 2/2001 | Schwartz et al. ............ 370/401 |
| 6,671,724 B1 * | 12/2003 | Pandya et al. ............... 709/226 |
| 6,728,208 B1 | 4/2004 | Puuskari | |
| 2003/0018714 A1 * | 1/2003 | Mikhailov et al. .......... 709/203 |
| 2003/0031172 A1 | 2/2003 | Grinfeld | |
| 2004/0153545 A1 * | 8/2004 | Pandya et al. ............... 709/226 |
| 2005/0068894 A1 * | 3/2005 | Yu et al. ...................... 370/235 |
| 2007/0211714 A1 * | 9/2007 | Metke et al. ................. 370/389 |

FOREIGN PATENT DOCUMENTS

| | | | |
|---|---|---|---|
| JP | 2002314592 A | * | 10/2002 |
| WO | WO 00/70825 | | 11/2000 |
| WO | WO 01/17291 | | 3/2001 |

OTHER PUBLICATIONS

Iren, The Transport Layer: Tutorial and Survey, Dec. 2001, Temple University, p. 46.*
Durst, TCP extensions for Space communication, 1997, The MITRE Corporation, p. 15.*
Clark, Explicit Allocation of Best-Effort Packet Delivery Service, IEEE, p. 12.*
Loughney et al., Loughney, Context Transfer Protocol (CXTP), 2005, Network Working Group, p. 43.*

* cited by examiner

*Primary Examiner*—Hassan Phillips
*Assistant Examiner*—Arvin Eskandarnia
(74) *Attorney, Agent, or Firm*—Mintz, Levin, Cohn, Ferris, Glovsky and Popeo, P.C.

(57) ABSTRACT

The invention discloses a method, transport layer protocol entity, device and system of transmitting data in a communications network. The method comprises opening and configuring a port of a transport layer protocol and determining a context profile for the port. The transport layer protocol entity sends data packets e.g. to the Internet Protocol layer according to the context profile.

87 Claims, 7 Drawing Sheets

| option-kind | length | |
|---|---|---|
| Option value |||

Fig. 7a

| context id | length | context type |
|---|---|---|
| traffic class || delay class |
| reliability class || priority |
| nominal throughput || reserved |
| minimum throughput || peak throughput |
| delivery of erroneous segs || delivery order |

Fig. 7b

CONTEXT PROFILE FOR DATA COMMUNICATIONS

BACKGROUND OF THE INVENTION

1. Field of the Invention

The invention relates to communication networks. In particular, the invention relates to an enhanced functionality of a transport layer protocol entity.

2. Description of the Related Art

The TCP (Transmission Control Protocol) is a set of rules (protocol) used along with the Internet Protocol (IP) to send data in the form of message units between computers over the Internet. While IP takes care of handling the actual delivery of the data, the TCP takes care of keeping track of the individual units of data (called segments, datagrams or packets) that a message is divided into for efficient routing through the Internet.

For example, when an HTML (Hyper Text Markup Language) file is sent to you from a Web server, the TCP program layer in that server divides the file into one or more packets, numbers the packets, and then forwards them individually to the IP program layer. Although each packet has the same destination IP address, it may get routed differently through the network. At the other end (the client program in your computer), the TCP reassembles the individual packets and waits until they have arrived to forward them to you as a single file.

The TCP is known as a connection-oriented protocol, which means that a connection is established (port is opened) and maintained until such time as the message or messages to be exchanged by the application programs at each end have been exchanged. The TCP is responsible for ensuring that a message is divided into the packets that IP manages and for reassembling the packets back into the complete message at the other end.

The TCP comprises four intertwined algorithms: slow start, congestion avoidance, fast retransmit, and fast recovery. The state variable (sstresh) determines whether the slow start or congestion avoidance algorithm is applied.

Slow start is an algorithm, which operates by observing that the rate at which new packets should be injected into the network is the rate at which the acknowledgments are returned by the other end.

Slow start takes an advantage of a window in the TCP, namely, the congestion window, called 'cwnd'. When a new connection is established with a host on another network, the congestion window is initialized to one segment (i.e., the maximum segment size announced by the other end typically approximately 1500 bytes or the default, 536 or 512 bytes). Each time an acknowledgement message (ACK) is received, the congestion window is increased by one segment. The sender can transmit up to the minimum of the congestion window and the advertised window (the window size advertised by the receiver). The congestion window is flow control imposed by the sender, while the advertised window is flow control imposed by the receiver. The former is based on the sender's assessment of perceived network congestion; the latter is related to the amount of available buffer space at the receiver for this connection.

The sender starts by transmitting one segment and waiting for its ACK. When that ACK is received, the congestion window is incremented from one to two, and two segments can be sent. When each of those two segments is acknowledged, the congestion window is increased to four. This provides an exponential growth, although it is not exactly exponential because the receiver may delay its ACKs, typically sending one ACK for every two segments that it receives.

At some point the capacity of the Internet can be reached, and an intermediate router will start discarding packets. This tells the sender that its congestion window has gotten too large.

During congestion avoidance, cwnd is incremented by 1 full-sized segment per round-trip time (RTT). Congestion avoidance continues until congestion is detected. One formula commonly used to update cwnd during congestion avoidance is given by equation Cwnd+=SMSS*SMSS/cwnd. This adjustment is executed on every incoming non-duplicate ACK. The equation provides an acceptable approximation to the underlying principle of increasing cwnd by 1 full-sized segment per RTT.

Another acceptable way to increase cwnd during congestion avoidance is to count the number of bytes that have been acknowledged by ACKs for new data. A drawback of this implementation is that it requires maintaining an additional state variable. When the number of bytes acknowledged reaches cwnd, then cwnd can be incremented by up to SMSS (Sender Maximum Segment Size) bytes. Note that during congestion avoidance, cwnd must not be increased by more than the larger of either 1 full-sized segment per RTT, or the value computed using the aforementioned equation.

When a TCP sender detects segment loss using the retransmission timer, the value of ssthresh (slow start threshold) must be set to no more than the value given in the following equation: ssthresh=max (FlightSize/2, 2*SMSS).

Furthermore, upon a timeout cwnd must be set to no more than the loss window, LW, which equals 1 full-sized segment (regardless of the value of IW (initial window)). Therefore, after retransmitting the dropped segment the TCP sender uses the slow start algorithm to increase the window from 1 full-sized segment to the new value of ssthresh, at which point congestion avoidance again takes over.

The TCP, however, includes a few unfavourable features. It is extremely scalable to different bit rates, but implicitly assumes "fat pipes" of large bandwidth*delay-products. The TCP implies high latency for the first segments and low link capacity (or flow capacity) in the early state of the traffic flow ramp-up. In the beginning of the communication flow, there are typically many small messages exchanged between client and server applications, such as registration, authentication and initiation messages which require delivery of segments before the data really is available. Trying to probe the network capacity by such determined messages is not truly data behavior and does not execute the slow start properly. Thus, when the data delivery starts, the slow start will begin. As the data amount may itself be small, it may happen that the slow start does not even have time to ramp up the link before the available data in the transmitter buffer is empty and after a pause for the next data burst, the slow start will begin again. This kind of path would unnecessarily be struggling always in the slow start.

Soon after the ramp-up, there is a possibility of radical fallback because of the congestion behavior or because of a packet loss in the wireless transmission. When the slow start is in the period of ramping up the link throughput, it may happen that a wireless link provides an erroneous packet (relying on the TCP to correct it) so that either the packet or the acknowledgement is missed. This causes the congestion avoidance to radically decrease the slow start threshold value and start with a slow start again.

A major disadvantage of the TCP is that it is completely unaware of the transmission bandwidth available on a path for a flow. TCP extensions improve performance over large bandwidth*delay product paths. TCP performance depends on the product of transfer rate and the round-trip delay. This bandwidth*delay product is the buffer space required at the sender and receiver to obtain maximum throughput. TCP performance problems arise when the bandwidth*delay product is large. This path is referred to as the "fat pipe". Packet losses can have a catastrophic effect on the throughput, as it may cause the data pipe to drain with every packet loss and require a slow start.

When considering, for example, mobile radio links, the end-to-end path is typically a combination of a wireless radio bearer link (defined for moderate bit rate) with packet error probability and the path through routing network having a "fat pipe". Thus probing the fat pipe is not possible, and probing the wireless part of the path is not efficient.

When mobile end-to-end applications are getting higher fraction of the traffic, paths of TCP flows are more determined by the radio link bandwidth configured for the radio bearer in the radio network and on the other hand by the terminal capabilities, than the routing network itself. Over the wireless radio interface probing of the TCP flow capacity is not necessarily favorable. For the end-to-end flow over several networks, anyway, it would be likely that it is the radio interface that determines the probing result of the TCP slow start and congestion algorithms.

Furthermore, the loss of packets due to congestion and due to packet errors in the wireless transmission are indistinguishable by the TCP. This is a drawback as the congestion and packet errors have very different origins and would require different actions.

FIG. 1 discloses one solution for determining a context in a mobile communications network. FIG. 1 discloses a plurality of different network elements between user equipment 10 and a server computer 18: a base station (BTS) 12, a radio network controller (RNC) 14, a serving GPRS support node (SGSN) 16, and a gateway GPRS support node (GGSN) 16. A set of different protocol stacks is used between the network elements. In order to send packets to external data networks, the user equipment 10 has to have a special address, that is, a Packet Data Protocol (PDP) address. Furthermore, a PDP context is created between the user equipment 10 and the gateway GPRS support node 16. The PDP context determines the type of the PDP, the PDP address, information on Quality of Service (QoS), and the address of the gateway GPRS support node 16. The PDP context is stored in the user equipment, serving GPRS support node, and gateway GPRS support node. The solution disclosed in Figure, however, does not provide an end-to-end solution between the user equipment 10 and an external data network entity.

Based on the above, there is an obvious need for a solution that would provide well-bounded and balanced operation during data transmission.

SUMMARY OF THE INVENTION

According to one aspect of the invention there is provided a method of transmitting data in a communications network. The method comprises opening and configuring a port of a transport layer protocol by an application and determining a context profile for the port.

In one embodiment of the invention, the method further comprises setting the context profile type as default, in which case normal transport layer protocol rules, algorithms and thresholds are used.

In one embodiment of the invention, the method further comprises setting the context profile type as bounded, in which case the context profile values are applied to the transport layer protocol.

In one embodiment of the invention, the method further comprises negotiating context profile definitions between a client and server transport layer entity during a transport layer protocol handshake procedure.

In one embodiment of the invention, the method further comprises transmitting at least some of the context profile in an Internet Protocol header. In one embodiment at least some of the context profile definitions are transmitted in a Transmission Control Protocol option header.

In one embodiment of the invention, the method further comprises re-negotiating the context profile definitions between the client and server during transmission of data packets.

In one embodiment of the invention, the context profile definitions comprise at least one of the following: traffic class, delay class, reliability class, priority, nominal throughput, minimum throughput, peak throughput, delivery of erroneous segments, and delivery order.

In one embodiment of the invention, the method further comprises setting the context profile definitions for the port based on at least one of transmitting terminal characteristics, receiving terminal characteristics, application characteristics, transmission network characteristics, transmitting terminal capabilities, receiving terminal capabilities, application capabilities, and transmission network capabilities.

In one embodiment of the invention, the method further comprises using a regular transmission speed of data packets according to the determined context profile for the port. In one embodiment of the invention, the method further comprises using a regular transmission interval of data according to the determined context profile for the port. In one embodiment of the invention, the method further comprises using a regular transmission data amount per time interval according to the determined context profile.

In one embodiment of the invention, the method further comprises receiving a context profile request with a client transport layer protocol entity from a server transport layer protocol entity, and adapting the context profile definitions or activated value set therein for the port in response to the request.

In one embodiment of the invention, the method further comprises receiving a context profile request with a server transport layer protocol entity from a client transport layer protocol entity, and adapting the context profile definitions or activated value set therein for the port in response to the request.

In one embodiment of the invention, the method further comprises monitoring performance values of sent data packets, and adapting the context profile definitions in response to the monitoring. In one embodiment, the context profile definitions are renegotiated between the client and server during the transmission of data packets. In one embodiment, the sending rate of data packets is changed. In one embodiment, the segment size of data packets is changed.

In one embodiment of the invention, the transport layer protocol is the Transmission Control Protocol.

In one embodiment of the invention, the transport layer protocol is the User Datagram Protocol.

According to another aspect of the invention there is provided a transport layer protocol entity for transmitting data packets, comprising an application layer interface and an Internet Protocol layer interface. An application is configured to open and configure a port of the transport layer protocol and to determine a context profile for the port via the application layer interface.

In one embodiment of the invention, the transport layer protocol entity is configured to transmit data packets to the Internet Protocol layer interface according to the context profile.

In one embodiment of the invention, the application is configured to set the context profile type as default, in which case normal transport layer protocol rules, algorithms and thresholds are used.

In one embodiment of the invention, the application is configured to set the context profile type as bounded, in which case the context profile values are applied to the transport layer protocol.

In one embodiment of the invention, a client transport layer protocol entity is configured to negotiate context profile definitions or activated value set therein with a server transport layer entity during a transport layer protocol handshake procedure. In one embodiment of the invention, the client transport layer protocol entity is configured to transmit at least some of the context profile definitions in an Internet Protocol header to the server transport layer protocol entity. In one embodiment of the invention, the client transport layer protocol entity is configured to transmit at least some of the context profile definitions in a Transmission Control Protocol option header to the server transport layer protocol entity. In one embodiment of the invention, the server transport layer protocol entity is configured to transmit at least some of the context profile definitions in an Internet Protocol header to the client transport layer protocol entity. In one embodiment of the invention, the server transport layer protocol entity is configured to transmit at least some of the context profile definitions in a Transmission Control Protocol option header to the client transport layer protocol entity.

In one embodiment of the invention, the client/server transport layer protocol entity is configured to re-negotiate the context profile definitions or activated value set therein with the server/client transport layer protocol entity during the transmission of data packets.

In one embodiment of the invention, the context profile definitions comprise at least one of the following: traffic class, delay class, reliability class, priority, nominal throughput, minimum throughput, peak throughput, delivery of erroneous segments, and delivery order.

In one embodiment of the invention, the transport layer protocol entity is configured to set the context profile definitions for the port based on at least one of transmitting terminal characteristics, receiving terminal characteristics, application characteristics, transmission network characteristics, transmitting terminal capabilities, receiving terminal capabilities, application capabilities, and transmission network capabilities.

In one embodiment of the invention, at least one of client transport layer protocol entity and a server transport layer protocol entity is configured to use a regular transmission interval of data packets according to the determined context profile for the port. In one embodiment of the invention, at least one of the client transport layer protocol entity and the server transport layer protocol entity is configured to use regular speed of data packets according to the determined context profile for the port. In one embodiment of the invention, at least one of the client transport layer protocol entity and the server transport layer protocol entity is configured to use regular amount of data per time interval according to the determined context profile for the port.

In one embodiment of the invention, a client transport layer protocol entity is configured to receive a context profile request from a server transport layer protocol entity and to adapt the context profile definitions for the port in response to the request.

In one embodiment of the invention, a server transport layer protocol entity is configured to receive a context profile request from a client transport layer protocol entity and to adapt the context profile definitions for the port in response to the request.

In one embodiment of the invention, at least one of a client transport layer protocol entity and a server transport layer protocol entity is configured to monitor performance values of sent data packets and to adapt the context profile definitions or activated value set therein in response to the monitoring.

In one embodiment of the invention, the client transport layer protocol entity is configured to re-negotiate the context profile definitions or activated value set therein with the server transport layer protocol entity during the transmission of data packets.

In one embodiment of the invention, at least one of the client transport layer protocol entity and the server transport layer protocol entity is configured to change the transmission interval of data packets.

In one embodiment of the invention, at least one of the client transport layer protocol entity and the server transport layer protocol entity is configured to change the sending rate of data packets.

In one embodiment of the invention, at least one of the client transport layer protocol entity and the server transport layer protocol entity is configured to change the segment size of data packets.

According to another aspect of the invention there is provided a device for transmitting data in a communications network, wherein the device is configured to open and configure a port of a transport layer protocol, and to determine a context profile for the port.

In one embodiment of the invention, the device is further configured to set the context profile type as default, in which case normal transport layer protocol rules, algorithms and thresholds are used.

In one embodiment of the invention, the device is further configured to set the context profile type as bounded, in which case the context profile values are applied to the transport layer protocol.

In one embodiment of the invention, the device is further configured to negotiate context profile definitions between a client and server transport layer entity during a transport layer protocol handshake procedure.

In one embodiment of the invention, the device is further configured to transmit at least some of the context profile in an Internet Protocol header.

In one embodiment of the invention, the device is further configured to transmit at least some of the context profile definitions in a Transmission Control Protocol option header.

In one embodiment of the invention, the device is further configured to re-negotiate the context profile definitions or activated value set therein between the client and server during transmission of data packets.

In one embodiment of the invention, the context profile definitions comprise at least one of the following: traffic class, delay class, reliability class, priority, nominal throughput, minimum throughput, peak throughput, delivery of erroneous segments, and delivery order.

The device according to claim 45, further configured to set the context profile definitions for the port based on at least one of transmitting terminal characteristics, receiving terminal characteristics, application characteristics, transmission network characteristics, transmitting terminal capabilities, receiving terminal capabilities, application capabilities, and transmission network capabilities.

In one embodiment of the invention, the device is further configured to use a regular transmission speed of data packets according to the determined context profile for the port.

In one embodiment of the invention, the device is further configured to use a regular transmission interval of data according to the determined context profile for the port.

In one embodiment of the invention, the device is further configured to use a regular transmission data amount per time interval according to the determined context profile.

In one embodiment of the invention, the device is further configured to receive a context profile request with a client transport layer protocol entity from a server transport layer protocol entity, and adapt the context profile definitions or activated value set therein for the port in response to the request.

In one embodiment of the invention, the device is further configured to receive a context profile request with a server transport layer protocol entity from a client transport layer protocol entity, and adapt the context profile definitions or activated value set therein for the port in response to the request.

In one embodiment of the invention, the device is further configured to monitor performance values of sent data packets, and adapt the context profile definitions or activated value set therein in response to the monitoring.

In one embodiment of the invention, the device is further configured to re-negotiate the context profile definitions or activated value set therein between the client and server during the transmission of data packets.

In one embodiment of the invention, the device is further configured to change the sending rate of data packets.

In one embodiment of the invention, the device is further configured to change the segment size of data packets.

In one embodiment of the invention, the transport layer protocol is the Transmission Control Protocol.

In one embodiment of the invention, the transport layer protocol is the User Datagram Protocol.

According to another aspect of the invention there is provided a communication system for transmitting data in a communication network. The communication system comprises at least one transport layer protocol entity comprising an application layer interface, an Internet Protocol layer interface, and wherein an application is configured to open and configure a port of the transport layer protocol and to determine a context profile for the port via the application layer interface.

In one embodiment of the invention, the transport layer protocol entity is configured to transmit data packets to the Internet Protocol layer interface according to the context profile.

In one embodiment of the invention, the application is configured to set the context profile type as default, in which case normal transport layer protocol rules, algorithms and thresholds are used.

In one embodiment of the invention, the application is configured to set the context profile type as bounded, in which case the context profile values are applied to the transport layer protocol.

In one embodiment of the invention, a client transport layer protocol entity is configured to negotiate context profile definitions or activated value set therein with a server transport layer entity during a transport layer protocol handshake procedure.

In one embodiment of the invention, the client transport layer protocol entity is configured to transmit at least some of the context profile definitions or activated value set therein in an Internet Protocol header to the server transport layer protocol entity.

In one embodiment of the invention, the client transport layer protocol entity is configured to transmit at least some of the context profile definitions or activated value set therein in a Transmission Control Protocol option header to the server transport layer protocol entity.

In one embodiment of the invention, the server transport layer protocol entity is configured to transmit at least some of the context profile definitions in an Internet Protocol header to the client transport layer protocol entity.

In one embodiment of the invention, the server transport layer protocol entity is configured to transmit at least some of the context profile definitions in a Transmission Control Protocol option header to the client transport layer protocol entity.

In one embodiment of the invention, the client transport layer protocol entity is configured to re-negotiate the context profile definitions or activated value set therein with the server transport layer protocol entity during the transmission of data packets.

In one embodiment of the invention, the context profile definitions comprise at least one of the following: traffic class, delay class, reliability class, priority, nominal throughput, minimum throughput, peak throughput, delivery of erroneous segments, and delivery order.

In one embodiment of the invention, the transport layer protocol entity is configured to set the context profile definitions for the port based on at least one of transmitting terminal characteristics, receiving terminal characteristics, application characteristics, transmission network characteristics, transmitting terminal capabilities, receiving terminal capabilities, application capabilities, and transmission network capabilities.

In one embodiment of the invention, at least one of a client transport layer protocol entity and a server transport layer protocol entity is configured to use a regular transmission interval of data packets according to the determined context profile for the port.

In one embodiment of the invention, at least one of a client transport layer protocol entity and a server transport layer protocol entity is configured to use regular speed of data packets according to the determined context profile for the port.

In one embodiment of the invention, at least one of a client transport layer protocol entity and a server transport layer protocol entity is configured to use regular amount of data per time interval according to the determined context profile for the port.

In one embodiment of the invention, a client transport layer protocol entity is configured to receive a context profile request from a server transport layer protocol entity and to adapt the context profile definitions or activated value set therein for the port in response to the request.

In one embodiment of the invention, a server transport layer protocol entity is configured to receive a context profile request from a client transport layer protocol entity and to adapt the context profile definitions or activated value set therein for the port in response to the request.

In one embodiment of the invention, at least one of a client transport layer protocol entity and a server transport layer protocol entity is configured to monitor performance values of sent data packets and to adapt the context profile definitions or activated value set therein in response to the monitoring.

In one embodiment of the invention, the client transport layer protocol entity is configured to re-negotiate the context profile definitions or activated value set therein with the server transport layer protocol entity during the transmission of data packets.

In one embodiment of the invention, at least one of the client transport layer protocol entity and the server transport layer protocol entity is configured to change the sending rate of data packets.

In one embodiment of the invention, at least one of the client transport layer protocol entity and the server transport layer protocol entity is configured to change the transmission interval of data packets.

In one embodiment of the invention, at least one of the client transport layer protocol entity and the server transport layer protocol entity is configured to change the segment size of data packets.

In one embodiment of the invention, the transport layer protocol is the Transmission Control Protocol.

In one embodiment of the invention, the transport layer protocol is the User Datagram Protocol.

According to another aspect of the invention there is provided a transport layer protocol entity for modifying an Internet Protocol header. The transport layer protocol entity is configured to at least partly set at least one field in the Internet Protocol header based on a context profile determined for a port of a transport layer protocol.

In one embodiment of the invention, the transport layer protocol entity is configured to set at least one of the traffic class field and the flow label field of the Internet Protocol header based on at least one of a traffic class definition and a delay class definition of the context profile. In one embodiment of the invention, the transport layer protocol entity is configured to incorporate at least one of a traffic class definition in the context profile into traffic class field in the Internet Protocol header and a delay class definition in the context profile into flow label field in the Internet Protocol header.

According to another aspect of the invention there is provided an application using a transport layer protocol, wherein the application is configured to transmit a context profile to the transport layer protocol, where the context profile is to be determined for a port of the transport protocol layer.

In one embodiment of the invention, the context profile definitions comprise at least one of the following: traffic class, delay class, reliability class, priority, nominal throughput, minimum throughput, peak throughput, delivery of erroneous segments, and delivery order.

The invention has several advantages over the prior-art solutions. The invention avoids the unnecessary use of the TCP slow start. Furthermore, the invention avoids the TCP congestion control fallback.

The bounded-pipe operation disclosed in the invention may allow more smooth resource usage and allocation and may further allow increase of the overall capacity, because by the invention, probing is not made blind and a-priori context profile is used in probing. This allows less radical probing and alleviates overshootings.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIG. 7a discloses a general form of a TCP option header;

FIG. 7b discloses a form of a TCP option header according to the invention; and

DETAILED DESCRIPTION OF THE EMBODIMENTS

Reference will now be made in detail to the embodiments of the present invention, examples of which are illustrated in the accompanying drawings.

Figure 1:
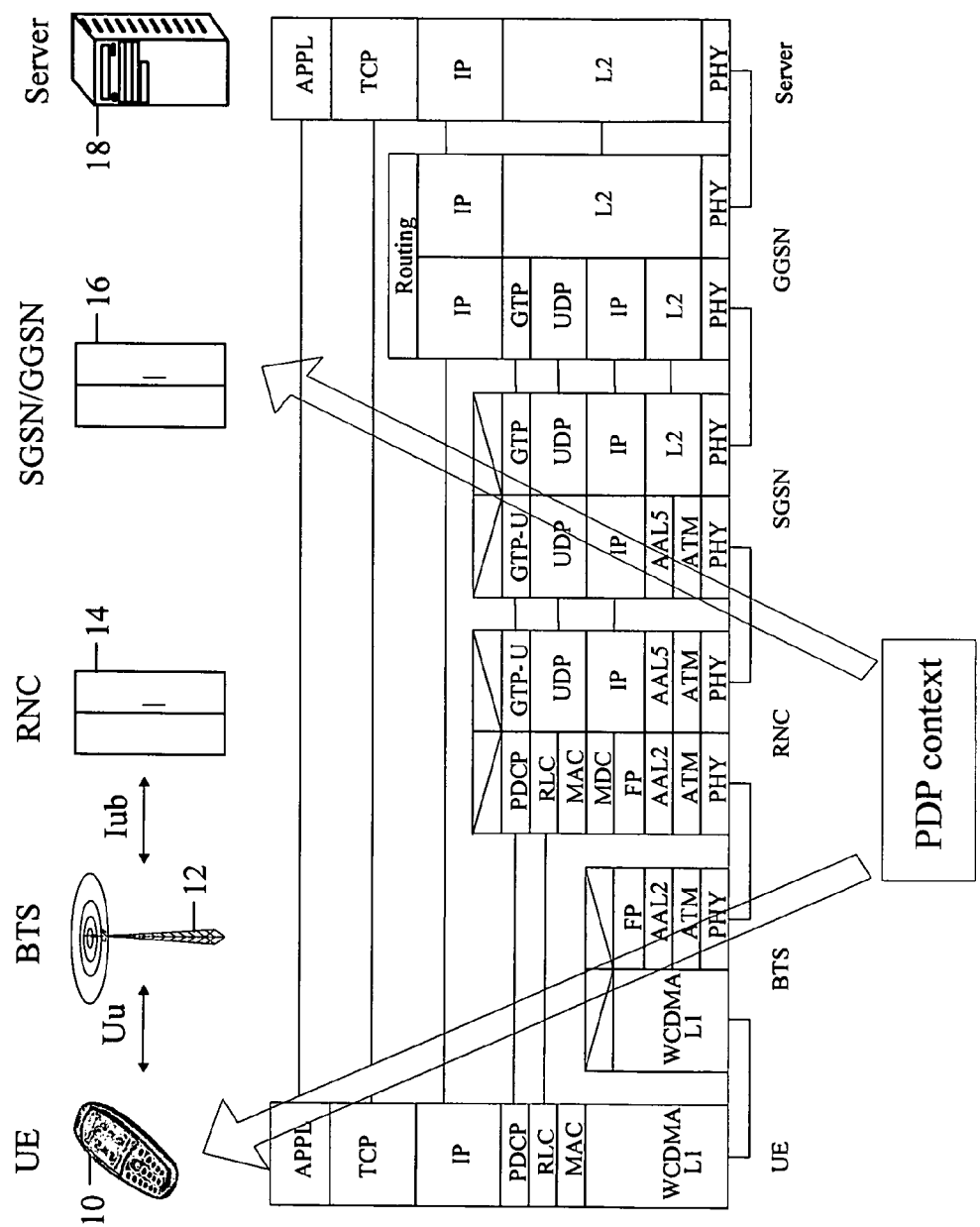
FIG. 1 discloses one prior art solution for determining a context in a mobile communications network.
Figure 2:
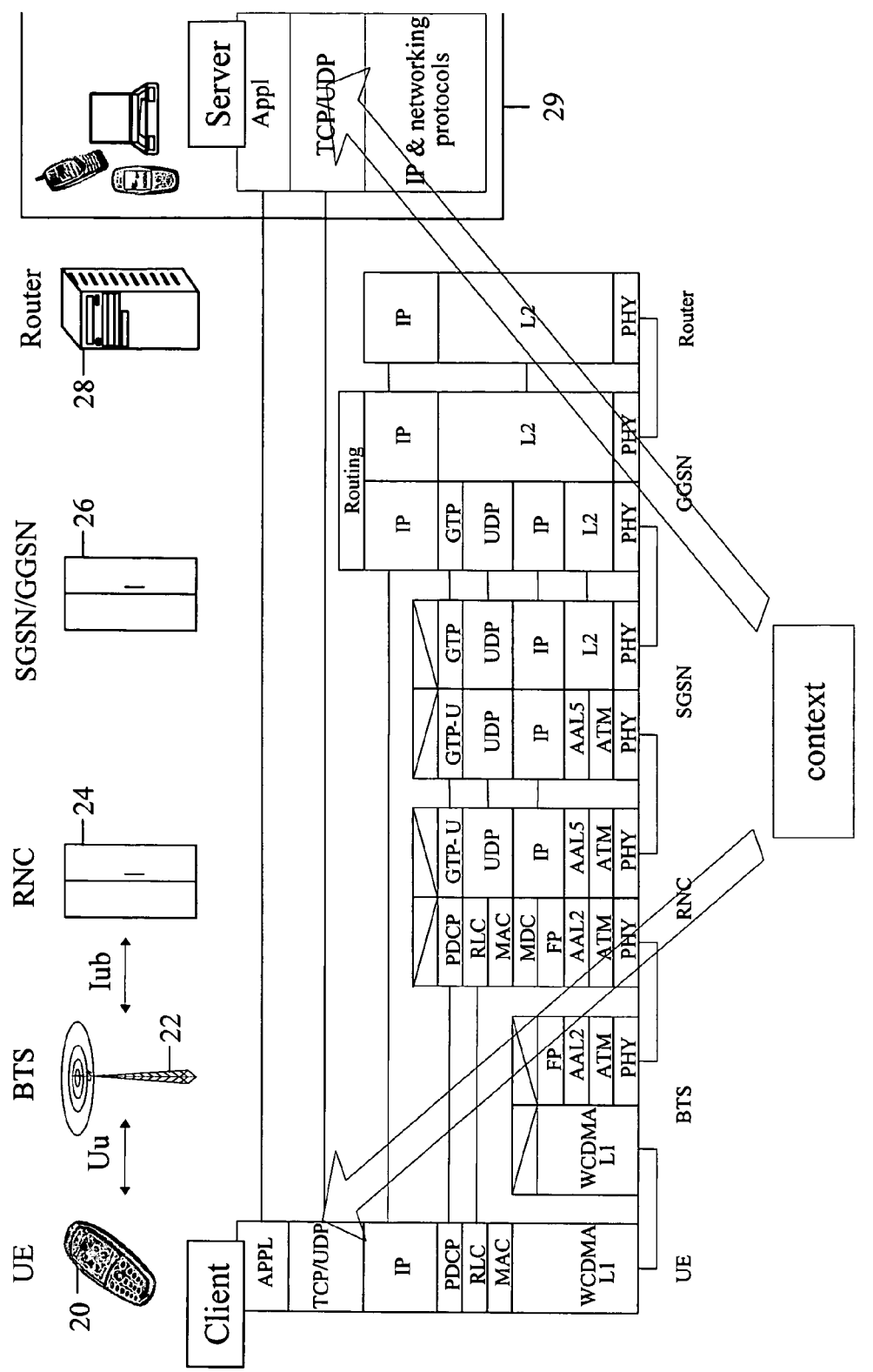
FIG. 2 discloses one embodiment of a general view of a system according to the invention.

FIG. 2 discloses one embodiment of a general view of a system according to the invention. FIG. 2 discloses a plurality of different network elements between user equipment 20 and a server computer 28: a base station (BTS) 22, a radio network controller (RNC) 24, a serving GPRS support node (SGSN) 26, and a gateway GPRS support node (GGSN) 26. A set of different protocol stacks is used between the network elements.

Both user equipment 20 and server computer 29 implement the Transmission Control Protocol (TCP) and the Internet Protocol (IP). Characteristic for the invention is that besides implementing the TCP, user equipment and server 29 implement an extension of the TCP transport protocol. The novel idea of the invention is that when opening and configuring a port of a transport layer protocol, the application using the transport layer protocol determines a context profile for the port. The context profile for the port determines how the transport layer protocol client entity transmits information to the corresponding server entity. Although FIG. 2 discloses that the TCP is used between user equipment 20 and server 29, the context profile may be determined, for example, to a UDP (User Datagram Protocol) port, an SCTP (Stream Control Transmission Protocol) port or to any other appropriate protocol port. Server 29 may reside in any appropriate device, e.g. in a mobile, portable, fixed, stationary terminal device.

Figure 3:
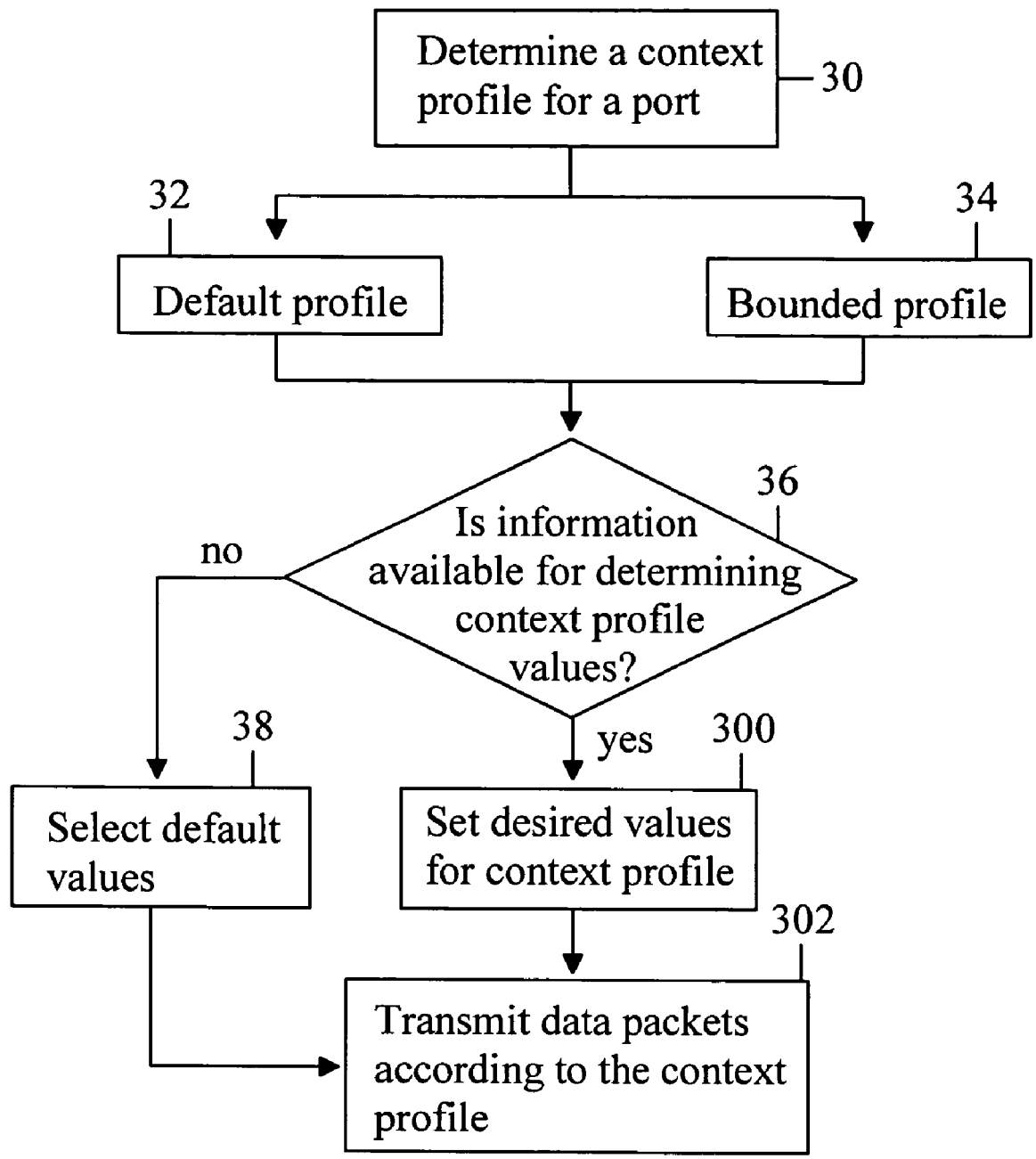
FIG. 3 discloses a block diagram illustrating context determination for a port according to the invention.

FIG. 3 discloses a block diagram illustrating context determination for a port according to the invention. Well-bounded TCP operation is established by opening (30) a context profile for a TCP port. The context is defined by a context identifier and it is valid end-to-end at both client and server TCP entities.

The invention defines a context profile for the TCP port (or UDP port respectively). The context profile type will be defined as 'default' (32) if the invention is used in the way identical to the prior art TCP. For the operation with the modified TCP rules, the context profile type is 'bounded' (34). In such a bounded context pipe, the operation of the TCP follows the 'new rules', which are described in more detail in the following chapters. The bounded context pipe does not restrict the use of the TCP in a connectionless network. On the contrary, the connectionless principle suits fine as the operation is bounded by a set of rules.

If the application, when opening and configuring the TCP port, is not aware of the context or what the reasonable bounds would be, it can choose from two options. In the first option, the application will set the context type as 'default' (36 and 38). This will cause TCP operation equal to the prior art definitions. An alternative for this is that the application sets the context type as 'bounded' and set the bounded-pipe value as the 'best effort'. The second alternative for the application is to set the context type as 'bounded' and set the bounded-pipe value to some reasonable and common practical value, e.g. 384 kbps (36 and 300). For many applications, this kind of default bounded-pipe value for the TCP flow is reasonable, because the amount of data will be small. When the context profile has been determined, data packets are transmitted according to the context profile (302).

The bounded-pipe value will be proposed and confirmed e.g. during the three-way handshake procedure of the TCP. The initiator of the flow can propose the context profile settings, but the request of the client may be downgraded by the server and the request of the server may be downgraded by the client. In mobile environment, a mobile terminal may know its capability class and the negotiated Transport Format Combination Set (TFCS), and it can propose a reasonable bounded-pipe value for a given bearer class, e.g. a bounded-pipe value equal to the highest Transport Format (TF) in the Transport Format Set (TFS). Even if bearers were not defined, the mobile terminal will have the capability class defined, which informs the decoder capability in the form of Transport Formats or bit rates enabled. The definition of the context profile actually allows that the radio bearer parameters are not defined separately, but they are inherent in the context profile. Thus, the mobile will only need to inform its capability class for the proper context value settings.

Figure 4:
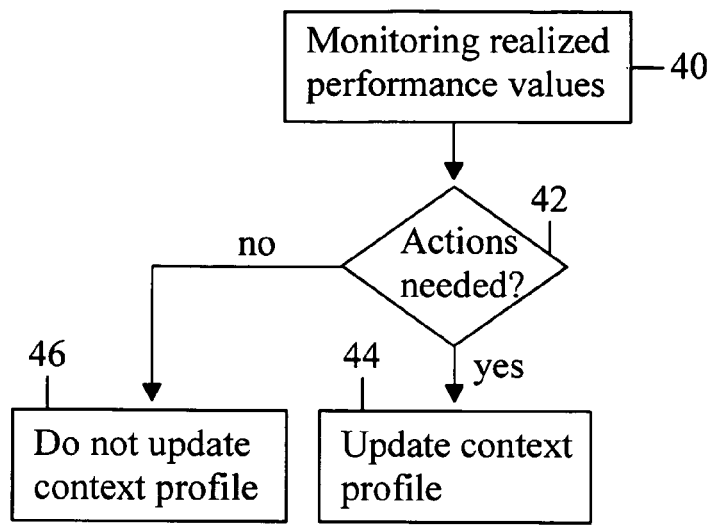
FIG. 4 discloses a block diagram illustrating monitoring realized performance values according to the invention.

FIG. 4 discloses an embodiment of the method in which realized performance values are monitored during data transmission. Realized performance values may be monitored during data transmission (40). The TCP bounded-pipe operation may be controlled by comparing the performance observed (measured) to the context parameters. These may be updated respectively. When the TCP round trip time (RTT) measurements are compared to the TCP context delay class, it can easily be detected, if the TCP flow is operating in the wanted bounded-pipe and if the quality is met. If the bounded-pipe quality is not good enough, the algorithms have to update the values of the pipe (42 and 44). The context profile or activated value set therein may, for example, be re-negotiated between the client and the server. If the bounded-pipe quality is good enough, the context profile definitions does not have to be updated (42 and 46).

Another measure of the bounded-pipe operation is the nominal throughput. If the nominal throughput meets the definitions of the bounded-pipe, the bounded-pipe rules will be applied. If the throughput deviates from the bounded-pipe, it may be desirable to use another nominal value. Again, the new nominal value may be re-negotiated between the client and the server. A numeral nominal value can be found e.g. from source (voice, video, multimedia) codecs. It is usual that some codec values (rate set) are more desirable than others. Therefore, if the most desirable nominal value for a codec is not met, it may be useful to re-negotiate a new, lower desirable codec value from the rate set. It is important to note that the prior art TCP does not recognize any such rate set value but will apply blind probing of the channel instead.

The delay criteria is often even more indicative one, as the nominal throughput can vary a lot because of the amount of data written to the TCP port is varying too. Close to constant segment delays in a given delay class would typically be preferred by the application. Due to the high variation of throughput, the peak and minimum values of the bounded-pipe may be set as well. However, delay criteria are still distinct.

If the measured round trip time (RTT) of the TCP segments, say, is worse than expected, the TCP can set its bounded-pipe value to the next magnitude higher value. This causes the TCP state machines transition to the new bounded-pipe. In the mobile terminal, this will also imply TFS reconfiguration.

The reasoning for the above is that in many mobile applications, the flow of data is either well-known and defined, if generated by a standardized source codec, if data flow is part of a messaging sequence (initialization, authentication), if the data flow is upper bounded by the device capability, or the data flow is known to take a short duration. In the first case, the bounded-pipe is exactly known and can be easily agreed between the client and the server by setting the context definitions. This will also imply bearer and Transport Format configurations of the mobile station respectively. The benefit of this is to avoid slow start and congestion control behavior of the TCP flow in this situation, where it is obviously not necessary. Another situation, where this kind of well-known context profile exists, is the UDP/RTP (Real-Time Transport Protocol) transmission, e.g. voice over IP, video streaming, video conferencing, etc.

In the second case, where the data flow takes only a short duration, it is advantageous to define the bounded-pipe value to anything reasonably high value or to some reasonable nominal value of the mobile capability, e.g. 384 kbps. The benefit of this is again to avoid the slow start and congestion control algorithms to affect the TCP flow. As for the short duration, the transmission control protocol has anyway no time to settle before the transmission is over already.

Figure 5:
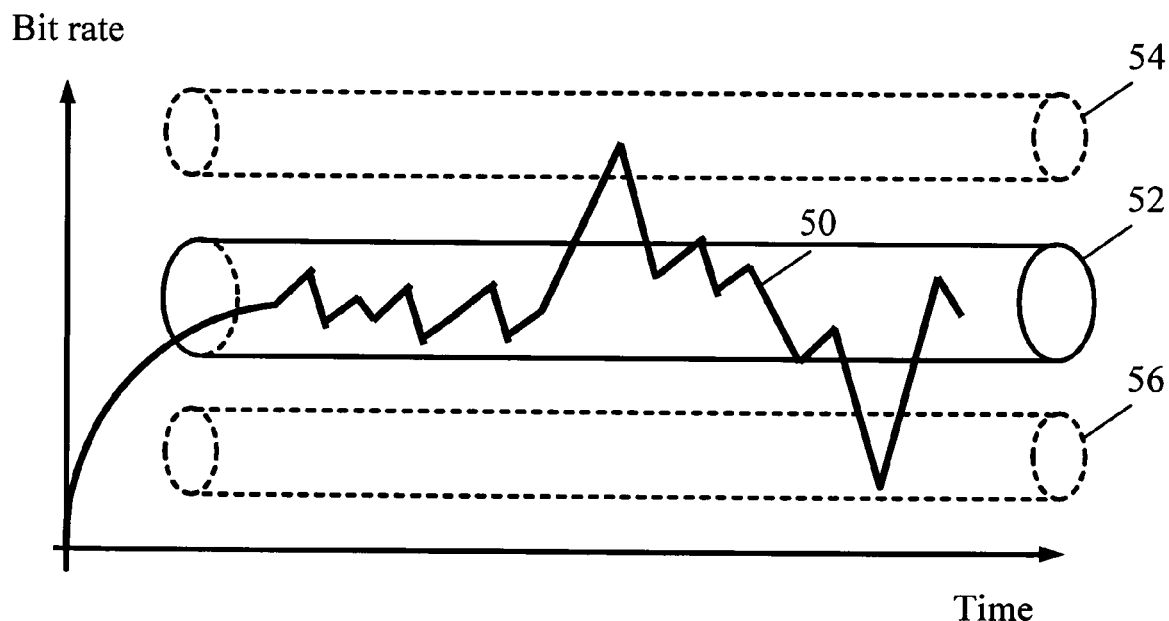
FIG. 5 discloses operation of a data flow by context profile parameters according to the invention.

FIG. 5 discloses operation of a data flow by context profile parameters according to the invention. FIG. 5 especially depicts a situation in which client and server transport protocol entities have negotiated end-to-end context profile between ports. A pipe 52 represents a nominal throughput value or pipe within which the data bit rate 50 is expected to remain.

When the data flow does not remain within the pipe, the client and server transport protocol entities may change to another pipe already negotiated before, e.g. to a minimum throughput pipe. It may also happen that the client and server transport protocol entities have not set any optional pipe values when the context profile was negotiated.

Therefore, when the throughput is detected to excessively deviate from the nominal throughput and is either higher than the peak throughput or lower than the minimum throughput (still having data in the buffers to transmit), out-of-pipe rules will be applied. In one embodiment, the out-of-pipe rules refer the original TCP rules for slow start/congestion avoidance/fast retransmit/fast recovery, but the nominal bounded-pipe taken as the initial value (of the sstresh).

In case the out-of-pipe situation occurs above the nominal throughput pipe, it is first checked if the context profile includes a nominal value that is above (pipe 54) the existing pipe and that new pipe value is taken into use. If a new nominal value is taken into use, the client transport protocol entity signals this to the server transport protocol entity in the next segment. If the context profile does not include a nominal value higher than the existing pipe, the TCP congestion avoidance algorithm is executed to probe for higher throughput cautiously. If there is no congestion, the flow is increased beyond the bounded-pipe (of the context profile) according to the congestion avoidance algorithm i.e. by linear increase of the cwnd, but so that sstresh is set to the nominal bounded-pipe value. Immediately, when the congestion happens, the TCP will drop back to the nominal bounded-pipe value (to the sstresh), but not down to the slow start. The operation may now continue in the bounded-pipe again.

In case the out-of-pipe situation occurs below the nominal throughput pipe, it is first checked if the context profile includes a nominal value that is below (pipe 56) the existing pipe and that new pipe value is taken into use. If a new nominal value is taken into use, the client transport protocol entity signals this to the server transport protocol entity in the next segment. If the context profile does not include a nominal value lower than the existing pipe, the TCP fast recovery algorithm is executed and the TCP tries to get back from the current throughput to the nominal bounded-pipe throughput without a slow start. This will happen nicely e.g. if packets were temporarily lost by a wireless link.

The TCP override could happen e.g. in the case of true network congestion. In this situation, the throughput is very low, acknowledgements are not received regularly, retransmission timers will expire and the out-of-pipe situation below the pipe operation is observed without successful fast recovery. In this case, the TCP will execute the prior art slow start and set its sstresh according to the prior art rules (ssthresh=max(FlightSize/2,2*SMSS)).

Now, if a (wireless) context profile is known at a TCP port, it enables to avoid slow start and congestion control, where they are not necessary, as the transmission path is limited by other factors (e.g. radio resource available) than the TCP bandwidth in the routing network. Or if not completely avoiding them, making them more smooth or determined in the bandwidth*delay product region, where they are not meaningful and only apply them after the congestion really happens in the routing network and becomes meaningful in the true TCP sense.

Figure 6:
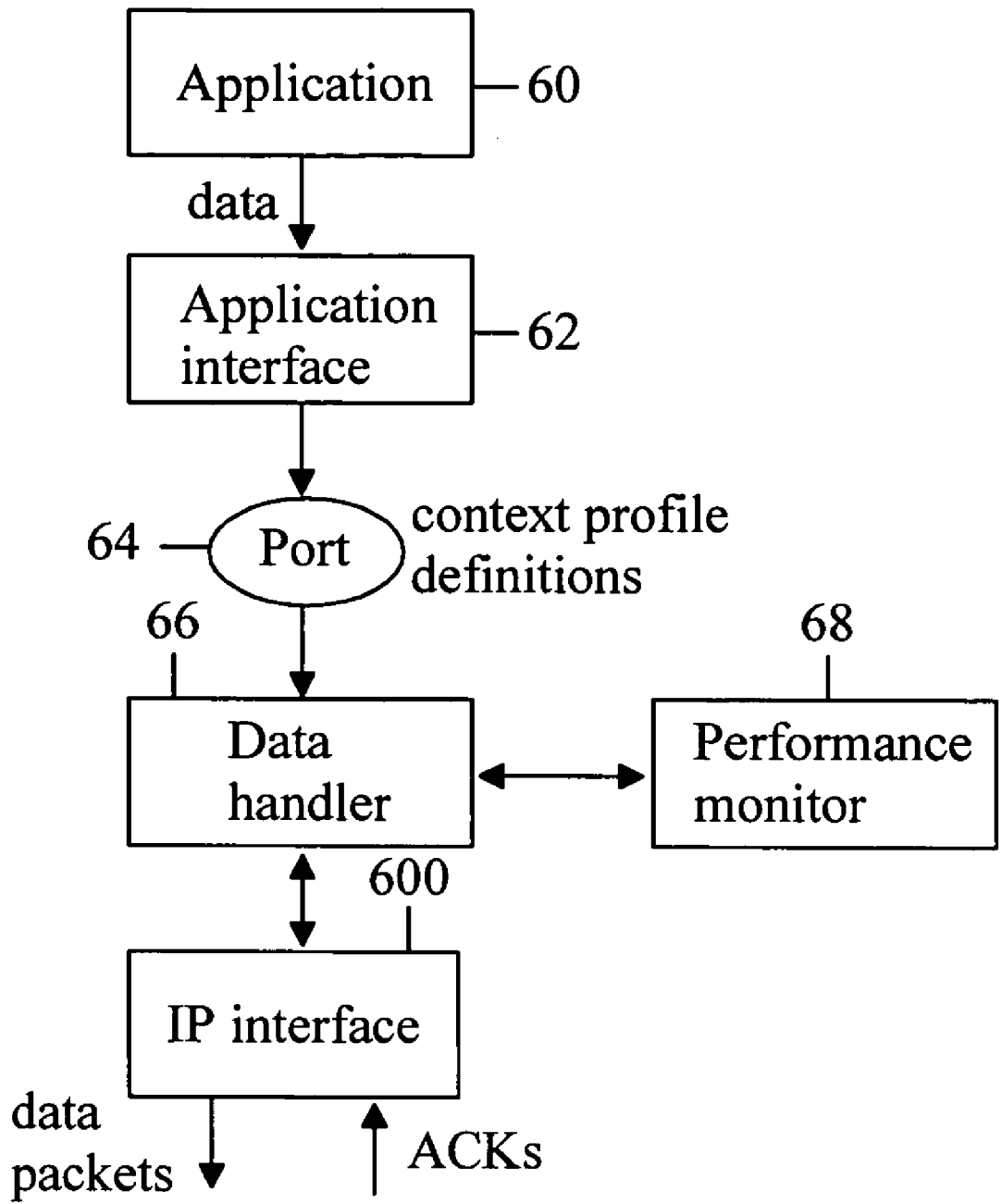
FIG. 6 discloses a simplified block diagram of a transmission protocol layer entity according to the invention.

FIG. 6 discloses a simplified block diagram of a transmission protocol layer entity according to the invention. The transmission protocol layer entity comprises four main blocks: an application interface 62, a data handler 66, a performance monitor 68 and an Internet protocol interface 600.

An application 60 opens and configures a port 64 of the transmission layer protocol and determines a context profile for the port via application interface 62. Also data from the application is received via application interface 62. Data handler 66 is responsible for sending data packets to Internet Protocol interface 600. Internet Protocol interface 600 receives e.g. acknowledgements relating to packets sent from the Internet Protocol layer and forwards them to data handler 66.

Performance monitor 68 monitors the acknowledgements received from the Internet Protocol layer. If the measured round trip time of the TCP segments is worse than expected, data handler may set its bounded-pipe value to the next magnitude higher value. This causes the TCP state machines transition to the new bounded-pipe. Another option is to re-negotiated new context profile definitions with the corresponding server. In another embodiment, if the nominal throughput meets the settings of the bounded-pipe defined in the context profile, the bounded-pipe rules will be applied. If the throughput deviates from the bounded-pipe, exceeds the minimum or the peak, it may be desirable to use another nominal value. Again, a new nominal value may be re-negotiated between the client and the server.

Data handler 66 may also be configured to change the sending rate of data packets or changing the segment size of data packets. If the measured round trip time of the TCP segments is worse than expected, data handler 66 may reduce the size of the data segments, and at the same time, increase the sending rate of those segments. If the measured round trip times then normalize, the size of the segments and the sending rate of the segments may also be changed back to previous values. Data handler 66 may also change only one of either the segment size or the segment sending rate.

In one embodiment, it may happen that data handler 66 receives an acknowledgement of a sent data packet very quickly after sending it. Let us assume that the ACK is received 20 ms after sending. A previously defined context profile determines that data packets are sent at 50 ms intervals. Therefore, the ACK of the previous packet is received before sending the next packet. In a normal TCP operation this would lead to a situation in which the TCP would send a greater amount of data after receiving the ACK than earlier. When repeating this several times it may happen that, for some reason, packets are lost, and at worst, the low start procedure is started.

The solution disclosed in the invention acts differently in this particular embodiment. When the ACK is received after 20 ms, data handler 66 waits to the next 50 ms instant and sends the next data packet only then. In its simplest form, this provides a constant sending rate of data packets even if acknowledgements are received.

In one embodiment, the application interface 62, data handler 66, performance monitor 68 and Internet Protocol interface 600 form a transport layer protocol entity. The transport protocol entity itself is e.g. a software application. In another embodiment, the entities disclosed in FIG. 6 may be implemented using at least one of hardware and software. The aforementioned entities may be implemented within a single network element, e.g. a server or a mobile terminal. The network element may comprise a single memory or memory area or a plurality of memories or memory areas that may include e.g. random access memories (RAM), read-only memories (ROM) etc. The memory may also include other applications or software components that are not described in more detail and also may include the computer program (or portion thereof), which when executed on a processing unit performs at least some of the steps of the invention. The processing unit may also include memory or a memory may be associated therewith which may include the computer program (or portion thereof) which when executed on processing unit performs at least some of the steps of the invention.

FIG. 7*a* discloses a general form of the TCP option header.
FIG. 7*b* discloses one embodiment of the TCP option header according to the invention.

The context profile field comprises an identifier for the context profile. Length field indicates the length of the option header. The context aware TCP option header comprises the following fields for the bounded-pipe TCP operation:

Traffic class
Delay class
Reliability class
Priority
Nominal throughput
Minimum throughput or lower bound of the pipe
Peak throughput or upper bound of the pipe
Delivery of erroneous segments
Delivery order In the following possible parameter alternatives are disclosed.

Traffic Class:
    client server direction
        Subscribed traffic class
        Conversational class Streaming class
Interactive class
Background class
Reserved
server client direction
   Reserved
   Conversational class
   Streaming class
   Interactive class
Background Class Delay Class:
   client server direction
      Subscribed delay class
      Delay class 1
      Delay class 2
      Delay class 3
      Delay class 4 (best effort)
      Delay class undefined
   server client direction
      Reserved
      Delay class 1
      Delay class 2
      Delay class 3
      Delay class 4 (best effort)
      Delay class undefined Reliability Class
   TCP
   UDP
   SCTP Priority:
   client server direction
      Subscribed precedence
      High priority
      Low priority
      Medium priority
      Undefined priority
   server client direction
      Reserved
      High priority
      Low priority
      Medium priority
      Undefined priority The priority parameter defined here does not necessarily affect routing protocols. It may, however, have an impact inside the new rules disclosed in the invention. It is possible that e.g. the flow ramp-up happens in a different way for the high priority flow compared to a low priority flow. Furthermore, also their bounded-pipe values may be set to different values biasing flow capacity primarily for the high priority flows.

Peak Throughput or Upper Bound of the Pipe:
   client server direction
      Subscribed peak throughput
      Up to 1 k octet/s
      Up to 2 k octet/s
      Up to 4 k octet/s
      Up to 8 k octet/s
      Up to 16 k octet/s
      Up to 32 k octet/s
      Up to 64 k octet/s
      Up to 128 k octet/s
      Up to 256 k octet/s
      Up to 512 k octet/s
      Up to 1 M octet/s
      Up to 2 M octet/s
      Up to 4 M octet/s
      Up to 8M octet/s
      Up to 16M octet/s
      Best effort
   server client direction
      Reserved
      Up to 1 k octet/s
      Up to 2 k octet/s
      Up to 4 k octet/s
      Up to 8 k octet/s
      Up to 16 k octet/s
      Up to 32 k octet/s
      Up to 64 k octet/s
      Up to 128 k octet/s
      Up to 256 k octet/s
      Up to 512 k octet/s
      Up to 1 M octet/s
      Up to 2 M octet/s
      Up to 4 M octet/s
      Up to 8M octet/s
      Up to 16M octet/s
      Best effort Alternatively, the throughput may be announced as the number of segments/s or as the number of Maximum Segment Size (MSS) segments/s. Typical Maximum Segment Sizes for the TCP are 536 bytes or 1500 bytes. For the UDP, the segment sizes are typically smaller. For the UDP/RTP video the segments may be large.

Nominal Throughput:
   client server direction
      Subscribed nominal throughput
      Up to 100 octet/s
      Up to 1 k octet/s
      Up to 2 k octet/s
      Up to 4 k octet/s
      Up to 8 k octet/s
      Up to 16 k octet/s
      Up to 32 k octet/s
      Up to 64 k octet/s
      Up to 128 k octet/s
      Up to 256 k octet/s
      Up to 512 k octet/s
      Up to 1 M octet/s
      Up to 2 M octet/s
      Up to 4 M octet/s
      Up to 8M octet/s
      Up to 16M octet/s
      Best effort
   server client direction
      Reserved
      Up to 100 octet/s
      Up to 1 k octet/s
      Up to 2 k octet/s
      Up to 4 k octet/s
      Up to 8 k octet/s
      Up to 16 k octet/s
      Up to 32 k octet/s
      Up to 64 k octet/s
      Up to 128 k octet/s
      Up to 256 k octet/s
      Up to 512 k octet/s
      Up to 1 M octet/s
      Up to 2 M octet/s
      Up to 4 M octet/s
      Up to 8M octet/s Up to 16M octet/s
Best effort Minimum Throughput or Lower Bound of the Pipe:
  client server direction
    Subscribed nominal throughput
    Up to 100 octet/s
    Up to 1 k octet/s
    Up to 2 k octet/s
    Up to 4 k octet/s
    Up to 8 k octet/s
    Up to 16 k octet/s
    Up to 32 k octet/s
    Up to 64 k octet/s
    Up to 128 k octet/s
    Up to 256 k octet/s
    Up to 512 k octet/s
    Up to 1 M octet/s
    Up to 2 M octet/s
    Up to 4 M octet/s
    Up to 8M octet/s
    Up to 16M octet/s
    Best effort
  server client direction
    Up to 100 octet/s
    Up to 1 k octet/s
    Up to 2 k octet/s
    Up to 4 k octet/s
    Up to 8 k octet/s
    Up to 16 k octet/s
    Up to 32 k octet/s
    Up to 64 k octet/s
    Up to 128 k octet/s
    Up to 256 k octet/s
    Up to 512 k octet/s
    Up to 1 M octet/s
    Up to 2 M octet/s
    Up to 4 M octet/s
    Up to 8M octet/s
    Up to 16M octet/s Delivery of Erroneous Segments:
  client server direction
    Delivery of erroneous segments (yes/no)
    Probability of error; erroneous segments per all segments for the flow Probability of bit error; erroneous segments*size of the segment/all bytes
  server client direction
    Delivery of erroneous segments (yes/no)
    Probability of error; erroneous segments per all segments for the flow
    Probability of bit error; erroneous segments*size of the segment/all bytes Delivery Order:
  client server direction
    Subscribed delivery order
    With delivery order (yes/no)
  client server direction
    reserved
    With delivery order (yes/no)

In one embodiment of the invention, in minimum the context profile has definitions for the traffic class, delay class and reliability class. In another embodiment, typical context definitions would include at least traffic class, delay class, reliability class and nominal throughput definitions. If none of the values is defined, a default context may be opened and the context profile set to 'best effort'. If any of the values is not defined, the particular value in the context profile may be set to 'best effort'.

The TCP entities may re-negotiate the context profile definitions or activated value set therein during the transmission by proposing a context update in the TCP options of any TCP segment. After the receiving port has agreed about the proposed context and responded this in the TCP options field of the acknowledgement, the transmitting port may start operating with the modified context parameters. The receiving port may deny the context update proposal if it is, for example, limited by the terminal capability or Transport Formats allowed. Before answering to the request, the terminal may of course try to upgrade its Transport formats or radio bearer configurations to satisfy the new context parameters. The operation continues with the previous context definitions as long as the transmitter has received the context change approval from the receiver. After the context change is announced to the transmitter, it instantaneously starts using the updated context profile values. The receiver does not necessarily need a context update synchronously to the transmitter. The receiver just continues acknowledging all the received TCP segments as before. However, if the context was updated to higher values, the receiver will start experiencing a higher rate of receiving segments and thus increased TCP throughput and higher buffer consumption. If the context was updated to a lower value, the receiver will start experiencing lower rate of receiving segments and thus lower throughput but relieved buffer consumption.

Figure 8:
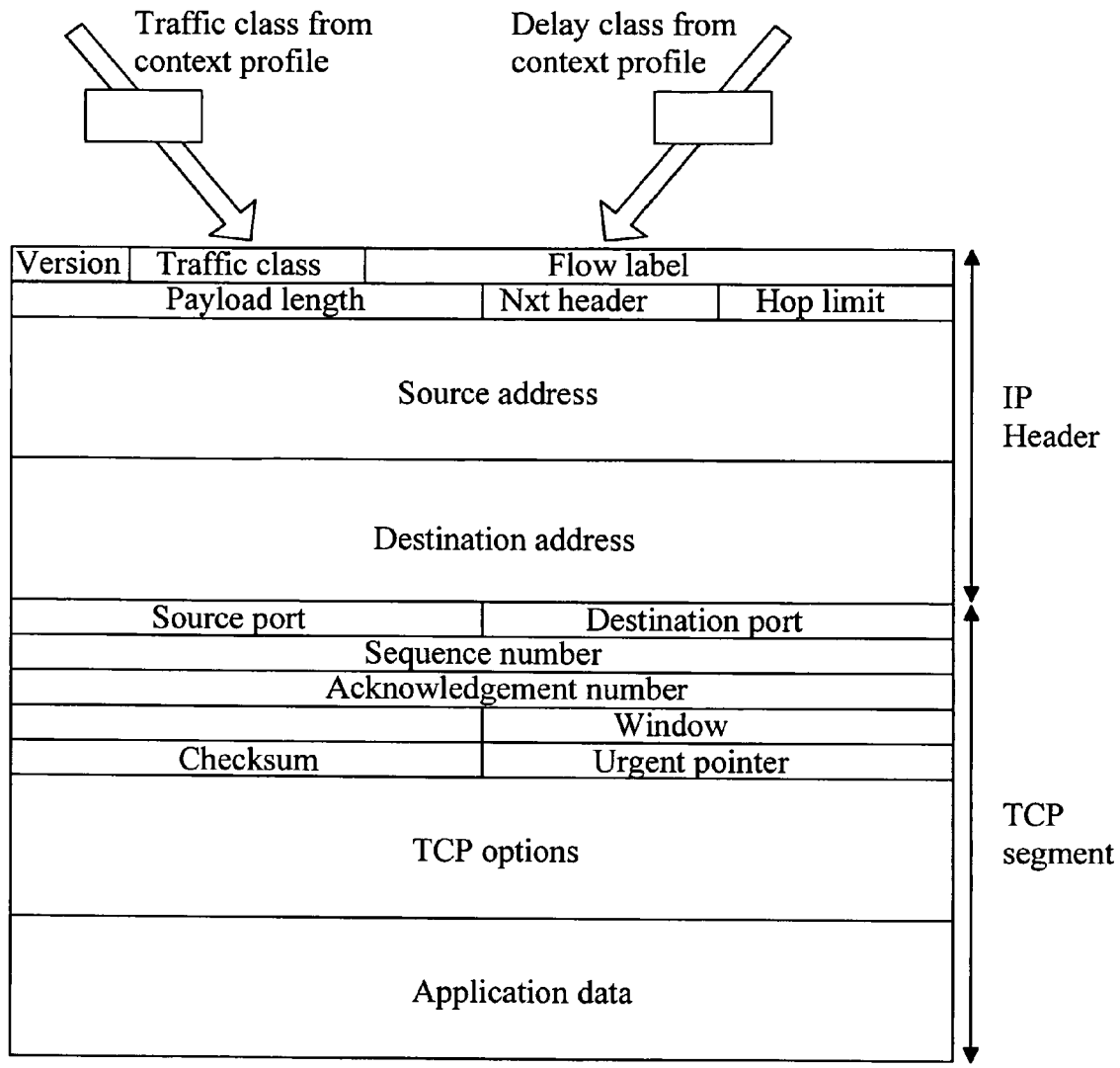
FIG. 8 discloses one embodiment of the invention in which traffic and delay class parameters are used in a special way.

FIG. 8 discloses one embodiment in which the traffic and delay class parameters are used in a special way. Traffic class and delay class context profile parameters may be directly incorporated into an IP header fields Traffic class and Flow label. Alternatively, the traffic class and delay class fields of the context profile are not directly incorporated but instead have at least an effect to the determination of the IP header fields Traffic class and Flow label. The information in these fields may then be utilized when IP packets are routed. This has the favourable impact that the context definitions at the transmitter and receiver may thus contribute to the Differentiated Services (DiffServ) processing at each routing node. Thus the invention, in addition to favourable operation at the transmitter and receiver, may also assist requested operation along the whole routing path as well.

The aforementioned examples and embodiments have focused on the TCP. The same principles of the invention may also be applied on the UDP. There are, or course, differences between the TCP and UDP. For example, the UDP does not use any handshake procedure or acknowledgement (ACK) messages.

An essential point in the invention is that the application that is opening a port has some preliminary information for the context profile definitions. The preliminary information may be acquired by the application itself as calculated data amount, say amount of data per object of a web-page, from the (sending/receiving) device characteristics or capabilities, from the coding rates of a source codec, from the radio network characteristics or from some other appropriate information source.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method comprising:
    opening and configuring a port of a transport layer protocol, the port being a transport control protocol port;
    determining a context profile for the transport control protocol port, the context profile configuring transmission of packets end-to-end between the transport control protocol port at a user element and another transport control protocol port at a server, the end-to-end configured transmission including the user element, a base station, a gateway node, and the server; and
  when the context profile or a bound is not known by the transport control protocol port, choosing one of a first setting of the context profile for the transport control protocol port as a default context profile type or a second setting of the bound for the transport control protocol port as a best effort value, wherein the context profile is a packet data protocol context.

2. The method according to claim 1, further comprising:
    setting a context profile type as default, in which normal transport layer protocol rules, algorithms and thresholds are used, wherein the port comprises at least one of a transport control protocol port and a user data gram protocol port.

3. The method according to claim 2, further comprising:
    setting the context profile type as bounded, in which case values of the context profile are applied to the transport layer protocol.

4. The method according to claim 1, further comprising: transmitting at least some of the context profile in an Internet Protocol header.

5. The method according to claim 1, further comprising: transmitting at least some of context profile definitions in a Transmission Control Protocol option header.

6. The method according to claim 1, wherein context profile definitions comprise at least one of the following:
    traffic class,
    delay class,
    reliability class,
    priority,
    nominal throughput,
    minimum throughput,
    peak throughput,
    delivery of erroneous segments, and
    delivery order.

7. The method according to claim 1, further comprising:
    setting context profile definitions for the port based on at least one of transmitting terminal characteristics, receiving terminal characteristics, application characteristics, transmission network characteristics, transmitting terminal capabilities, receiving terminal capabilities, application capabilities, and transmission network capabilities.

8. The method according to claim 1, further comprising:
    using a regular transmission speed of the data packets according to the determined context profile for the port.

9. The method according to claim 1, further comprising:
    using a regular transmission interval of the data according to the determined context profile for the port.

10. The method according to claim 1, further comprising:
    using a regular transmission data amount per time interval according to the determined context profile.

11. The method according to claim 1, further comprising:
    receiving a context profile request with a client transport layer protocol entity from a server transport layer protocol entity; and
    adapting context profile definitions or an activated value set therein for the port in response to the request.

12. The method according to claim 1, further comprising:
    receiving a context profile request with a server transport layer protocol entity from a client transport layer protocol entity; and
    adapting context profile definitions or an activated value set therein for the port in response to the request.

13. The method according to claim 1, further comprising:
    monitoring performance values of sent data packets; and
    adapting context profile definitions or an activated value set therein in response to the monitoring.

14. The method according to claim 13, further comprising:
    re-negotiating the context profile definitions or the activated value set therein between a client and server during the transmission of the data packets.

15. The method according to claim 13, further comprising:
    changing a sending rate of the data packets.

16. The method according to claim 13, further comprising:
    changing a segment size of the data packets.

17. The method according to claim 1, wherein the transport layer protocol is a Transmission Control Protocol.

18. The method according to claim 1, wherein the transport layer protocol is a User Datagram Protocol.

19. An apparatus comprising:
    at least one processor; and
    at least one memory including computer program code, the at least one memory and the computer program code configured to, working with the at least one processor, cause the apparatus to provide at least the following: an application layer interface; an Internet Protocol layer interface; and wherein an application is configured to open and configure a port of the transport layer protocol and to determine a context profile for the port via the application layer interface, the context profile configuring transmission of packets end-to-end between a second port at a user element and the port via a base station and a gateway node rather than configuring the transmission based on a context data protocol between the user element and the gateway node, and
  when the context profile or a bound is not known by the transport control protocol port, choosing one of a first setting of the context profile for the transport control protocol port as a default context profile type or a second setting of the bound for the transport control protocol port as a best effort value, wherein the context profile is a packet data protocol context.

20. The apparatus according to claim 19, wherein the transport layer protocol entity is configured to transmit the data packets to the Internet Protocol layer interface according to the context profile.

21. The apparatus according to claim 19, wherein the application is configured to set a context profile type as default, in which case normal transport layer protocol rules, algorithms and thresholds are used.

22. The apparatus according to claim 19, wherein the application is configured to set a context profile type as bounded, in which case the values of context profile values are applied to the transport layer protocol.

23. The apparatus according to claim 19, wherein a client transport layer protocol entity is configured to negotiate context profile definitions or an activated value set therein with a server transport layer protocol entity during a transport layer protocol handshake procedure.

24. The apparatus according to claim 23, wherein the client transport layer protocol entity is configured to transmit at least some of the context profile definitions or the activated value set therein in an Internet Protocol header to the server transport layer protocol entity.

25. The apparatus according to claim 23, wherein the client transport layer protocol entity is configured to transmit at least some of the context profile definitions or the activated value set therein in a Transmission Control Protocol option header to the server transport layer protocol entity.

26. The apparatus according to claim 23, wherein the server transport layer protocol entity is configured to transmit at least some of the context profile definitions in an Internet Protocol header to the client transport layer protocol entity.

27. The apparatus according to claim 23, wherein the server transport layer protocol entity is configured to transmit at least some of the context profile definitions in a Transmission Control Protocol option header to the client transport layer protocol entity.

28. The apparatus according to claim 23, wherein the client transport layer protocol entity is configured to re-negotiate the context profile definitions or the activated value set therein with the server transport layer protocol entity during the transmission of the data packets.

29. The apparatus according to claim 19, wherein context profile definitions comprise at least one of the following:
   traffic class,
   delay class,
   reliability class,
   priority,
   nominal throughput,
   minimum throughput,
   peak throughput,
   delivery of erroneous segments; and
   delivery order.

30. The apparatus according to claim 19, wherein the transport layer protocol entity is configured to set context profile definitions for the port based on at least one of transmitting terminal characteristics, receiving terminal characteristics, application characteristics, transmission network characteristics, transmitting terminal capabilities, receiving terminal capabilities, application capabilities, and transmission network capabilities.

31. The apparatus according to claim 19, wherein at least one of a client transport layer protocol entity and a server transport layer protocol entity is configured to use a regular transmission interval of the data packets according to the determined context profile for the port.

32. The apparatus according to claim 19, wherein at least one of a client transport layer protocol entity and a server transport layer protocol entity is configured to use a regular speed of the data packets according to the determined context profile for the port.

33. The apparatus according to claim 19, wherein at least one of a client transport layer protocol entity and a server transport layer protocol entity is configured to use a regular amount of data per time interval according to the determined context profile for the port.

34. The apparatus according to claim 19, wherein a client transport layer protocol entity is configured to receive a context profile request from a server transport layer protocol entity and to adapt context profile definitions or an activated value set therein for the port in response to the request.

35. The apparatus according to claim 19, wherein a server transport layer protocol entity is configured to receive a context profile request from a client transport layer protocol entity and to adapt context profile definitions or an activated value set therein for the port in response to the request.

36. The apparatus according to claim 19, wherein at least one of a client transport layer protocol entity and a server transport layer protocol entity is configured to monitor performance values of the transmitted data packets and to adapt context profile definitions or an activated value set therein in response to the monitoring.

37. The apparatus according to claim 36, wherein at least one of the client transport layer protocol entity and the server transport layer protocol entity is configured to change a sending rate of the data packets.

38. The apparatus according to claim 36, wherein at least one of the client transport layer protocol entity and the server transport layer protocol entity is configured to change a transmission interval of the data packets.

39. The apparatus according to claim 36, wherein at least one of the client transport layer protocol entity and the server transport layer protocol entity is configured to change a segment size of the data packets.

40. The apparatus according to claim 19, wherein the transport layer protocol is a Transmission Control Protocol.

41. The apparatus according to claim 19, wherein the transport layer protocol is the User Datagram Protocol.

42. A device comprising: at least one processor; and at least one memory, wherein the at least one processor and the at least one memory are configured to provide operations comprising:
   opening and configuring a port of a transport layer protocol, the port being a transport control protocol port;
   determining a context profile for the transport control protocol port, the context profile configuring transmission of packets end-to-end between the transport control protocol port at a user element and another transport control protocol port at a server, the end-to-end configured transmission including the user element, a base station, a gateway node, and the server; and
   when the context profile or a bound is not known by the transport control protocol port, choosing one of a first setting of the context profile for the transport control protocol port as a default context profile type or a second setting of the bound for the transport control protocol port as a best effort value, wherein the context profile is a packet data protocol context.

43. The device according to claim 42, further comprising:
   setting a context profile type as default, in which normal transport layer protocol rules, algorithms and thresholds are used.

44. The device according to claim 43, further comprising:
   setting a context profile type as bounded, in which context profile values are applied to the transport layer protocol.

45. The device according to claim 42, further comprising:
   negotiating context profile definitions between a client and server transport layer protocol entity during a transport layer protocol handshake procedure.

46. The device according to claim 45, further comprising:
   transmitting at least some of the context profile in an Internet Protocol header.

47. The device according to claim 45, further comprising:
   transmitting at least some of the context profile definitions in a Transmission Control Protocol option header.

48. The device according to claim 45, further comprising:
   re-negotiating the context profile definitions or an activated value set therein between the client and server during the transmission of the data packets.

49. The device according to claim 42, wherein context profile definitions comprise at least one of the following:
   traffic class,
   delay class,
   reliability class,
   priority,
   nominal throughput, minimum throughput,
peak throughput,
delivery of erroneous segments, and
delivery order.

50. The device according to claim 42, further comprising:
setting context profile definitions for the port based on at least one of transmitting terminal characteristics, receiving terminal characteristics, application characteristics, transmission network characteristics, transmitting terminal capabilities, receiving terminal capabilities, application capabilities, and transmission network capabilities.

51. The device according to claim 42, further comprising:
using a regular transmission speed of the data packets according to the determined context profile for the port.

52. The device according to claim 42, further comprising:
using a regular transmission interval of the data packets according to the determined context profile for the port.

53. The device according to claim 42, further comprising:
using a regular transmission data amount per time interval according to the determined context profile.

54. The device according to claim 42, further comprising:
receiving a context profile request with a client transport layer protocol entity from a server transport layer protocol entity; and
adapting context profile definitions or an activated value set therein for the port in response to the request.

55. The device according to claim 42, further comprising:
receiving a context profile request with a server transport layer protocol entity from a client transport layer protocol entity; and
adapting context profile definitions or an activated value set therein for the port in response to the request.

56. The device according to claim 42, further comprising:
monitoring performance values of the transmitted data packets; and
adapting context profile definitions or an activated value set therein in response to the monitoring.

57. The device according to claim 56, further comprising:
negotiating the context profile definitions or activated value set therein between a client and a server during the transmission of the data packets.

58. The device according to claim 56, further comprising:
changing a sending rate of the data packets.

59. The device according to claim 56, further comprising:
change a segment size of the data packets.

60. The device according to claim 42, wherein the transport layer protocol is a Transmission Control Protocol.

61. The device according to claim 42, wherein the transport layer protocol is a User Datagram Protocol.

62. A communications system comprising: at least one processor; and at least one memory including computer program code, the at least one memory and the computer program code configured to, working with the at least one processor, cause the apparatus to provide at least the following: at least one transport layer protocol entity comprising: an application layer interface, and an Internet Protocol layer interface, wherein an application is configured to open and configure a port of the transport layer protocol entity and to determine a context profile for the port via the application layer interface, the context profile configuring transmission of packets end-to-end between a second port at a user element and the port via a base station and a gateway node rather than configuring the transmission based on a context data protocol between the user element and the gateway node,
when the context profile or a bound is not known by the transport control protocol port, choosing one of a first setting of the context profile for the transport control protocol port as a default context profile type or a second setting of the bound for the transport control protocol port as a best effort value, wherein the context profile is a packet data protocol context.

63. The communication system according to claim 62, wherein the transport layer protocol entity is configured to transmit the data packets to the Internet Protocol layer interface according to the context profile.

64. The communication system according to claim 62, wherein the application is configured to set a context profile type as default, in which normal transport layer protocol rules, algorithms and thresholds are used.

65. The communication system according to claim 62, wherein the application is configured to set a context profile type as bounded, in which context profile values are applied to the transport layer protocol.

66. The communication system according to claim 62, wherein a client transport layer protocol entity is configured to negotiate context profile definitions or an activated value set therein with a server transport layer protocol entity during a transport layer protocol handshake procedure.

67. The communication system according to claim 66, wherein the client transport layer protocol entity is configured to transmit at least some of the context profile definitions or the activated value set therein in an Internet Protocol header to the server transport layer protocol entity.

68. The communication system according to claim 66, wherein the client transport layer protocol entity is configured to transmit at least some of the context profile definitions or the activated value set therein in a Transmission Control Protocol option header to the server transport layer protocol entity.

69. The communication system according to claim 66, wherein the server transport layer protocol entity is configured to transmit at least some of the context profile definitions in an Internet Protocol header to the client transport layer protocol entity.

70. The communication system according to claim 66, wherein the server transport layer protocol entity is configured to transmit at least some of the context profile definitions in a Transmission Control Protocol option header to the client transport layer protocol entity.

71. The communication system according to claim 66, wherein the client transport layer protocol entity is configured to re-negotiate the context profile definitions or the activated value set therein with the server transport layer protocol entity during the transmission of the data packets.

72. The communication system according to claim 62, wherein context profile definitions comprise at least one of the following:
traffic class,
delay class,
reliability class,
priority,
nominal throughput,
minimum throughput,
peak throughput,
delivery of erroneous segments, and
delivery order.

73. The communication system according to claim 62, wherein the transport layer protocol entity is configured to set context profile definitions for the port based on at least one of transmitting terminal characteristics, receiving terminal characteristics, application characteristics, transmission network characteristics, transmitting terminal capabilities, receiving terminal capabilities, application capabilities, and transmission network capabilities.

74. The communication system according to claim 62, wherein at least one of a client transport layer protocol entity and a server transport layer protocol entity is configured to use a regular transmission interval of the data packets according to the determined context profile for the port.

75. The communication system according to claim 62, wherein at least one of a client transport layer protocol entity and a server transport layer protocol entity is configured to use a regular speed of the data packets according to the determined context profile for the port.

76. The communication system according to claim 62, wherein at least one of a client transport layer protocol entity and a server transport layer protocol entity is configured to use a regular amount of data per time interval according to the determined context profile for the port.

77. The communication system according to claim 62, wherein a client transport layer protocol entity is configured to receive a context profile request from a server transport layer protocol entity and to adapt context profile definitions or an activated value set therein for the port in response to the request.

78. The communication system according to claim 62, wherein a server transport layer protocol entity is configured to receive a context profile request from a client transport layer protocol entity and to adapt context profile definitions or an activated value set therein for the port in response to the request.

79. The communication system according to claim 62, wherein at least one of a client transport layer protocol entity and a server transport layer protocol entity is configured to monitor performance values of the transmitted data packets and to adapt context profile definitions or an activated value set therein in response to the monitoring.

80. The communication system according to claim 79, wherein the client transport layer protocol entity is configured to negotiate context profile definitions or an activated value set therein with the server transport layer protocol entity during the transmission of the data packets.

81. The communication system according to claim 79, wherein at least one of the client transport layer protocol entity and the server transport layer protocol entity is configured to change a sending rate of the data packets.

82. The communication system according to claim 79, wherein at least one of the client transport layer protocol entity and the server transport layer protocol entity is configured to change a transmission interval of the data packets.

83. The communication system according to claim 79, wherein at least one of the client transport layer protocol entity and the server transport layer protocol entity is configured to change a segment size of the data packets.

84. The communication system according to claim 62, wherein the transport layer protocol is a Transmission Control Protocol.

85. The communication system according to claim 62, wherein the transport layer protocol is a User Datagram Protocol.

86. A computer readable storage medium including program instructions which when executed by a processor provide operations comprising:
  opening and configuring a port of a transport layer protocol, the port being
  a transport control protocol port;
  determining a context profile for the transport control protocol port, the context profile configuring transmission of packets end-to-end between the transport control protocol port at a user element and another transport control protocol port at a server, the end-to-end configured transmission including the user element, a base station, a gateway node, and the server; and
  when the context profile or a bound is not known by the transport control protocol port, choosing one of a first setting of the context profile for the transport control protocol port as a default context profile type or a second setting of the bound for the transport control protocol port as a best effort value, wherein the context profile is a packet data protocol context.

87. The computer readable storage medium according to claim 86, wherein context profile definitions comprise at least one of the following:
  traffic class,
  delay class,
  reliability class,
  priority,
  nominal throughput,
  minimum throughput,
  peak throughput,
  delivery of erroneous segments, and
  delivery order.

* * * * *